J. L. & W. SCHRADE.
POCKET KNIFE.
APPLICATION FILED AUG. 11, 1909.
969,909.
Patented Sept. 13, 1910.
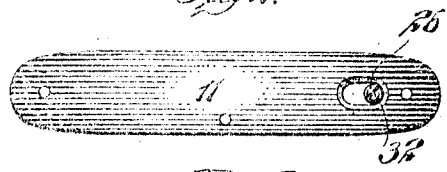

UNITED STATES PATENT OFFICE.

JACOB LOUIS SCHRADE AND WILLIAM SCHRADE, OF WALDEN, NEW YORK.

POCKET-KNIFE.

969,909.   Specification of Letters Patent.   Patented Sept. 13, 1910.

Application filed August 14, 1909. Serial No. 512,779.

*To all whom it may concern:*

Be it known that we, JACOB LOUIS SCHRADE and WILLIAM SCHRADE, citizens of the United States, and residents of Walden, in the county of Orange and State of New York, have invented certain new and useful Improvements in Pocket-Knives, of which the following is a specification.

The invention relates to improvements in pocket-knives, and consists in the novel features and combinations of parts hereinafter described, and particularly pointed out in the claims.

Our invention relates more particularly to pocket-knives of the type having means for locking the blade in its open and closed positions and means for causing a closed blade to fly open when manually released from its locking means. In the present instance we employ a pivoted locking lever for normally securing the blade in its open and closed positions, a spring normally pressing on the locking end of said lever, and a push-button slide carrying a push-button to, at the proper time, be pressed inwardly against the non-locking end of said lever for freeing the other end thereof from its locking engagement with the knife-blade. The push-button slide is normally adapted to stop and be held by friction in any position to which it may be moved by pressure applied to the push-button, and our purpose is after each closing of a blade and also preferably after each opening of a blade, to move said slide and push-button to such safety-position that any inadvertent inward movement of the push-button may not operate to free the locking-lever from said blade. The push-button, for its safety position, may be moved directly over the locking end of the locking lever, so that any inward movement of the button may not free said end from the blade but, if anything, more securely press said end into engagement with the blade, or said button may be moved entirely beyond the range of the locking-lever so that said button if then pressed inwardly may be wholly ineffective to operate said lever. In lieu of taxing the owner of the knife to move the push-button to a safety position, we may employ a spring to automatically move said button to such position.

The invention will be fully understood from the detailed description hereinafter presented, reference being had to the accompanying drawings, in which:

Figure 1 is a side elevation of a pocket-knife embodying our invention; Fig. 2 is an enlarged side elevation of the same with the outer mounting removed to expose the metal lining and the push-button with its coöperating parts; Fig. 3 is a view corresponding with Fig. 2 but with the push-button and the slide carrying the same removed; Fig. 4 is a view corresponding with Figs. 2 and 3 but with a portion of the knife broken away and the push-button and its coöperating applied parts removed to fully expose the metal lining and the slots and separating bar or bridge formed therein for a tiltable lever employed for locking or releasing the blade; Fig. 5 is a like view, partly in section, of the same, with the lining removed to expose the blade-opening spring and the recesses in the tang of the blade to receive the end of the tiltable locking lever; Fig. 6 is an enlarged front edge view, partly broken away and partly in section, of the knife, with the blade locked in its closed position and the push-button in its safety-position in which it is incapable of causing the tiltable lock-lever to release the blade; Fig. 7 is a detached enlarged perspective view of the tiltable lock-lever; Fig. 8 is a detached perspective view of the push-button and its spring-slide; and Fig. 9 is a view corresponding substantially with the sectional portion of Fig. 6 but showing the push-button out of range of the lock-lever so as to be incapable in such position of operating the lock-lever to release the blade, the construction shown in Fig. 9 being a modification to indicate that in lieu of the push-button being moved to a location over the locking end of the lever, as shown in Fig. 6, where it is inoperative to release said lever from the blade, it may be moved to an extreme opposite position from over or entirely out of range of said lever.

In the drawings, 10 designates the linings, usually of brass, of the knife-handle, 11 the mountings secured on and covering said linings, 12 a blade pivotally secured in a known manner between the end portions of the sides of the handle, and 13 a known fly-spring for automatically moving the blade to an open position when said blade is released from the locking mechanism of our invention. The shank of the blade 12 has at opposite sides of the bushing 14 which encompasses the middle part of the rivet 15, known longitudinal recesses numbered 16, 17, respectively, the recess 16 receiving the locking device when the blade is closed, to hold it closed, and the recess 17 receiving said device when the blade is open, to lock it open.

The lining 10, at one side of the blade, is formed with openings 18, 19 separated by a bar or bridge 20, and preferably the opening 19 will be longer than the opening 18. The openings 18, 19 are adjacent to the shank or tang of the blade and parallel with the recesses 16, 17 therein.

Upon the bar or bridge 20 is mounted a bar-shaped locking-lever 21 (Fig. 7) which is preferably provided with a transverse groove or recess 22 on its inner side to pass upon said bridge 20, said bridge affording a fulcrum for said lever and with said recess 22 preventing endwise movement of said lever, while at the same time affording a bearing to permit a tilting or rocking movement of the lever when necessary. The recess 22 permits the locking-lever to be set partly within the openings 18, 19, and this is important in that thereby the sides of said openings may be utilized as guides for the lever during its rocking or pivotal movements and to prevent lateral or sidewise shifting of said lever. The groove or recess 22 also permits the lever 21 to sink to some extent into the brass lining 10 and to thereby become more efficient in action. We also preferably bend or curve the lever 21 so that its end portions will when in action enter the openings 18, 19. The locking-lever 21 is preferably formed of a rectangular piece of steel, as shown in Fig. 7, so as to be of durable, efficient and lasting character. The outer end of the locking-lever 21 is the end which engages the recesses 16, 17 of the blade, and for the sake of greater efficiency and perfection of mechanical movement and detail we have said end longer than the other end of said lever, and for this reason make the opening 19 in the lining 10 of greater length than the opening 18 therein.

The locking-lever 21 is seated upon the bar or bridge 20 and is there normally held with its outer end projected or tilted inwardly partly through the opening 19 and in one or the other of the recesses 16, 17 of the blade, by a locking-spring 23, more clearly shown in Fig. 3, which is a leaf-spring cut out in its interior longitudinal portion or slotted, as at 24, and secured at one end under the head of a rivet 25, while at its other or outer end it presses against the outer or longer end of the locking-lever 21 and normally holds the same in its locking position, as shown in Figs. 3, 6 and 9. The inner end of the locking-spring 23 is recessed to pass below the head of the rivet 25 and straddle said rivet.

The spring 23 normally holds the locking-lever 21 in its locking position, and some means must be provided for, at the proper time, tilting said lever to its unlocking or releasing position, and in the present instance we provide a longitudinally movable push-button 26 for this purpose. The push-button 26 is preferably screwed into a slidable bar 27 (Fig. 8) which has at its inner side a spring-tongue 28, which presses against the lining 10 within the outline of the slot 24 in the spring 23, while the bar 27 is confined within an elongated recess 29 formed in the adjacent mounting 11. The bar 27 is pressed outwardly against the outer wall of the recess 29 by the spring-tongue 28 and hence is under a tension serving to hold it in any position within said recess to which it may be moved. One of the main purposes of the spring-tongue 28 is, however, to keep the push-button 26 normally pressed outwardly so that its inner stud end will stand free of the locking-lever 21. The outer end of the push-button 26 is within and projects partly through an elongated slot 30 formed in the mounting 11 and said button is slidable in said slot. The button 26 has a threaded shank which may be screwed into a threaded hole in the bar 27, and at the inner end of this shank is an inwardly projecting reduced or stud portion 31 (Fig. 8) which is utilized to engage the shorter end of the locking-lever 21 when the button is pressed inwardly with the purpose of tilting said lever to release the blade 12 and permit the spring 13 to cause it to fly open. The button 26 may have in its outer end a screwdriver groove 32 (Fig. 2) for convenience in securing the button to the bar 27. Our purpose is to apply the button 26 to position after the knife has been completed and the outer surfaces of the mountings have received finishing treatment, and hence we provide a button capable of being applied as the final step in completing the knife. If the button 26 were applied before the outer surface of the mountings were finished, the projecting portion of the button would interfere with the mountings being ground in their finishing treatment. By having the button 26 project prominently through the slot 30, the mechanism is rendered very convenient of operation.

In accordance with our invention, in its preferred embodiment, we form the openings 18, 19 and bridge 20 in the lining 10 at one side of the blade and provide the locking-lever 21, lock-spring 23, push-button 26 and push-button slide 27, 28. As auxiliary to our invention we provide, in the construction shown in Fig. 6, a coiled-spring 33 having a normal action to push the button-slide to a position in which the button is over the locking-end of the lever 21 and incapable, if pressed inwardly, of releasing said lever from the blade, while in the construction shown in Fig. 9, we provide a coiled spring 34 adapted to pull the button slide to carry the push-button out of range of the locking-lever so as to render it incapable, if pushed inwardly, of releasing said lever from the blade. It is important that the button 26 should be incapable of releasing the blade except when that result is intended, since otherwise the blade might be released to open when the knife is in one's pocket and pressure is unintentionally, as when leaning against something, exerted against the button 26. Under all ordinary conditions the spring tension in the button-slide will hold said slide in whatever position it may be moved to and the user of the knife may move said slide to the safety position of the button, but so that the user may not have to charge his mind with the desirability of moving the slide and button to a safety position before placing the knife in his pocket, we provide one or the other of the springs 33, 34 to automatically move the button-slide to a normal safety position and only leave it for the user to move the button to its operative position when he desires to release the blade.

In Fig. 6 we show the blade closed and the push-button 26 as normally in its safety or inoperative position, the outer end of the lock 21 being held in the recess 16 of the blade by the spring 23. When it is desired that the blade 12 shall fly open, the push-button 26 will be moved along the slot 30 until said button is over the inner or shorter end of the lever 21 and then pressed inwardly against the lever to tilt its outer end from the recess of the blade 12, whereupon the spring 13 will cause the blade to fly open. The pressure on the button 26 having been released, the outer end of the lock 21 is free to enter the recess 17 of the open blade and hold said blade open and the spring 33 may move the button slide and button to their normal safety position shown in Fig. 6, so that by no accidental inward movement of the button would the lock be removed from the blade during the use of the latter. When it is desired to close the blade, the push-button 26 will be moved over the inner or shorter end of the lock 21 and pressed inwardly against the same for the purpose of tilting the outer or longer end of said lock from the recess 17 to release the blade and permit the same to be closed. Upon the release of the push-button, the spring 33 will automatically move the same to its inoperative or safety position shown in Fig. 6. Upon the closing of the blade 12 the lock 21 will enter the recess 16 and hold the same closed.

In the construction shown in Fig. 9, it will be necessary when it is desired that the blade shall open, to move the push-button 26 in a direction toward the rivet 15 or until said button is over the inner end of the lever 21 and then press said button inwardly against said end of said lever so as to tilt the outer end of said lever outwardly from the recess 16 in the blade, thus freeing the blade to be acted upon by the spring 13. After the push button 26 of Fig. 9 has been released from the pressure of the hand, the spring 34 will retract said button and its slide to the position shown in Fig. 9, whereby the push-button is carried beyond the locking lever 21, and any accidental or other inward movement of the push-button will be ineffective to operate the locking lever 21. The constructions shown in Figs. 6 and 9 are intended to attain the same final result so far as giving the push-button a safety position is concerned, such position in Fig. 6 being shown as over the outer or locking end of the lever, while in Fig. 9, as a modification, such position is indicated as inwardly beyond the range of the lever.

In each form of the invention shown a single push-button is utilized for freeing the blade to fly open and moved or permitted to move to a safety position so as not to free the blade from its locking means after it has been opened, said button also being movable to a safety position after the blade has been closed, so that said blade may not by any inadvertent inward pressure on the button be freed to fly open.

We have described the details of the preferred construction embodying our invention but do not wish to be limited to such details, since we regard our invention as in many respects generic and not confined to details of form and arrangement. Our locking-lever is an improvement on any prior blade locking mechanism known to us, and our slidable push-button adapted not only to release the locking mechanism but to be moved or automatically move to a safety-position where it will be incapable of operating the blade locking mechanism to release the blade, is novel and important and not to be confined, in every instance, to any special blade-locking mechanism.

What we claim as our invention and desire to secure by Letters-Patent, is:

1. In a pocket-knife having automatic blade-opening means and recesses in the shank of the blade, a locking-lever bar pivotally mounted at a point between its ends whereby it is adapted at one end to enter said recesses, a locking-spring normally engaging said lever to hold it in its locking position, and a longitudinally slidable push-button for releasing said lever from the blade; substantially as set forth.

2. In a pocket-knife having automatic blade-opening means and recesses in the shank of the blade, a locking-lever bar pivotally mounted at a point between its ends whereby it is adapted at one end to enter said recesses, a locking-spring normally engaging said lever to hold it in its locking position, and a longitudinally slidable push-button for releasing said lever from the blade, the lining of the knife-handle having openings in it separated by a bar to receive said locking-lever, which is fulcrumed on said bar; substantially as set forth.

3. In a pocket-knife having automatic blade-opening means and recesses in the shank of the blade, a locking-lever bar pivotally mounted at a point between its ends whereby it is adapted at one end to enter said recesses, a locking-spring normally engaging said lever to hold it in its locking position, and a longitudinally slidable push-button for releasing said lever from the blade, the lining of the knife-handle having openings in it separated by a bar to receive said locking-lever, which is recessed to receive and seat on said bar; substantially as set forth.

4. In a pocket-knife having automatic blade-opening means and recesses in the shank of the blade, a locking-lever bar pivotally mounted at a point between its ends whereby it is adapted at one end to enter said recesses, a locking-spring normally engaging said lever to hold it in its locking position, and a longitudinally slidable push-button for releasing said lever from the blade, the lining of the knife-handle having openings in it separated by a bar to receive said locking lever which is recessed to receive and seat on said bar and slightly curved to dip through said lining; substantially as set forth.

5. In a pocket-knife having automatic blade-opening means and recesses in the shank of the blade, a locking-lever bar pivotally mounted at a point between its ends whereby it is adapted at one end to enter said recesses, a locking-spring normally engaging said lever to hold it in its locking position, and a longitudinally slidable push-button for releasing said lever from the blade, said locking-spring being a bar-spring fastened at one end and at its other end bearing against the locking-end of said lever and having an opening in it to permit the push-button to act against said lever to release it from the blade; substantially as set forth.

6. In a pocket-knife having automatic blade-opening means and recesses in the shank of the blade, a locking-lever bar pivotally mounted at a point between its ends whereby it is adapted at one end to enter said recesses, a locking spring normally engaging said lever to hold it in its locking position, and a longitudinally slidable push-button for when in one position releasing the lever from the blade and when moved from such position being inoperative to release said lever; substantially as set forth.

7. In a pocket-knife having automatic blade-opening means and recesses in the shank of the blade, a locking-lever bar pivotally mounted at a point between its ends whereby it is adapted at one end to enter said recesses, a locking-spring normally engaging said lever to hold it in its locking position, a longitudinally slidable push-button for when in one position releasing the lever from the blade and when moved from such position being inoperative to release said lever, and means for automatically moving said button to a normal inoperative or safety position; substantially as set forth.

8. In a pocket-knife having automatic blade-opening means and recesses in the shank of the blade, a locking-lever bar pivotally mounted at a point between its ends whereby it is adapted at one end to enter said recesses, a locking-spring normally engaging said lever to hold it in its locking position, a push-button slide between the lining and mounting of the knife-handle, and a push-button carried by said slide and exposed through an elongated slot in said mounting, said push-button being adapted when in one position to be pressed inwardly for releasing said lever from the blade and when moved to a different position being inoperative to release said lever; substantially as set forth.

9. In a pocket-knife having automatic blade opening means and recesses in the shank of the blade, a locking-lever bar pivotally mounted at a point between its ends whereby it is adapted at one end to enter said recesses, a locking-spring normally engaging said lever to hold it in its locking position, a push-button slide between the lining and mounting of the knife-handle, and a push-button carried by said slide and exposed through an elongated slot in said mounting, said push-button being adapted when in one position to be pressed inwardly for releasing said lever from the blade and when moved to a different position being inoperative to release said lever, combined with means for automatically moving said slide to carry said push button to its normal inoperative or safety position; substantially as set forth.

10. In a pocket-knife having automatic blade-opening means and recesses in the shank of the blade, a locking-lever bar pivotally mounted at a point between its ends whereby it is adapted at one end to enter said recesses, a locking-spring normally engaging said lever to hold it in its locking position, a push-button slide between the lining and mounting of the knife-handle, and a push-button carried by said slide and exposed through an elongated slot in said mounting, said push-button being adapted when in one position to be pressed inwardly for releasing said lever from the blade and when moved to a different position being inoperative to release said lever, and said push-button having its shank screwed into said slide and having a reduced inner end portion to engage, when pressed inwardly, the non-locking end of said lever; substantially as set forth.

11. In a pocket-knife having blade-opening means and spring actuated locking means for locking the blade stationary, a longitudinally slidable push-button to release said locking means from the blade when said button is in one position and being inoperative when moved to a different or safety position; substantially as set forth.

12. In a pocket-knife having automatic blade-opening means and spring actuated locking means for locking the blade stationary, a longitudinally slidable push-button to release said locking means from the blade when said button is in one position and being inoperative when moved to a different or safety position, combined with means for automatically moving said button to its inoperative position; substantially as set forth.

13. In a pocket-knife having automatic blade-opening means and spring actuated locking means for locking the blade stationary, a push-button slide between the lining and mounting of the knife-handle, and a push-button carried by said slide and exposed through an elongated slot in said mounting, said push-button being adapted when in one position to be pressed inwardly for releasing said locking means from said blade and when moved to a different position being inoperative to release the blade; substantially as set forth.

14. In a pocket-knife having automatic blade-opening means and spring actuated locking means for locking the blade stationary, a push-button slide between the lining and mounting of the knife-handle, and a push-button carried by said slide and exposed through an elongated slot in said mounting, said push-button being adapted when in one position to be pressed inwardly for releasing said locking means from said blade and when moved to a different position being inoperative to release the blade, combined with means for automatically moving said slide to carry said push-button to its normal inoperative or safety-position; substantially as set forth.

15. In a pocket-knife having automatic blade-opening means and spring actuated locking means for locking the blade stationary, a push-button slide between the lining and mounting of the knife-handle, and a push-button carried by said slide and exposed through an elongated slot in said mounting, said push-button being adapted when in one position to be pressed inwardly for releasing said locking means from said blade and when moved to a different position being inoperative to release the blade, and said push-button having its shank screwed into said slide and having a reduced inner end portion to engage, when pressed inwardly, said locking means to release the same from the blade; substantially as set forth.

16. In a pocket-knife having automatic blade-opening means and spring-actuated locking means for locking the blade stationary, a push-button slide between the lining and mounting of the knife-handle, and a push-button carried by said slide and exposed through an elongated slot in said mounting, said push-button being adapted when in one position to be pressed inwardly for releasing said locking means from said blade and when moved to a different position being inoperative to release the blade, said slide being a bar set in a recess in the mounting and having a tongue pressing against the lining, whereby said slide has a normal tendency to remain in any position to which it may be moved; substantially as set forth.

Signed at Walden, in the county of Orange, and State of New York, this 12 day of Aug. A. D. 1909.

JACOB LOUIS SCHRADE.
WILLIAM SCHRADE.

Witnesses:
CYRUS B. FOWLER,
DAVID P. DECKER.